United States Patent [19]

Tomoff

[11] Patent Number: 5,046,850
[45] Date of Patent: Sep. 10, 1991

[54] DRIVING MECHANISM FOR DRIVING AN OSCILLATING POLARIZER

[75] Inventor: Toma Tomoff, Überlingen, Fed. Rep. of Germany

[73] Assignee: Bodenseewerk Perkin Elmer GmbH, Überlingen, Fed. Rep. of Germany

[21] Appl. No.: 400,304

[22] Filed: Aug. 29, 1989

[30] Foreign Application Priority Data

Sep. 7, 1988 [DE] Fed. Rep. of Germany ....... 3830398

[51] Int. Cl.$^5$ .............................................. G01J 4/00
[52] U.S. Cl. ................................................. 356/367
[58] Field of Search ....................... 356/368, 369, 367; 250/225

[56] References Cited

U.S. PATENT DOCUMENTS 4,849,623 7/1989 Osaki et al. ..................... 356/368 X

OTHER PUBLICATIONS

Bilenko et al. "Measurement of the Inclination of the Axis of the Light-Polarization Ellipse", *Pribory i Tekhnika Eksperimenta*, No. 6, pp 218-220, 12/1975.

*Primary Examiner*—Davis L. Willis
*Assistant Examiner*—Matthew W. Koren
*Attorney, Agent, or Firm*—Thomas P. Murphy; Edwin T. Grimes

[57] ABSTRACT

In a driving mechanism for driving an oscillating polarizer in a polarimeter, the polarizer is driven by a stepper motor which is controlled by a computer to make a reciprocating movement. A reference position sensor is connected to the oscillating polarizer, to provide a reference signal when the oscillating polarizer is in a determined position. A zero position of the reference position sensor is obtained by spacing the reference position sensor a predetermined number of steps of the stepper motor.

8 Claims, 3 Drawing Sheets

DRIVING MECHANISM FOR DRIVING AN OSCILLATING POLARIZER

FIELD OF INVENTION

The invention relates to a driving mechanism for driving an oscillating polarizer of a polarimeter.

BACKGROUND OF INVENTION

German patent application 1 159 180 discloses a polarimeter with a polarizer, an analyzer, and a radiation receiver arranged behind the analyzer in which an optically active sample is inserted between the polarizer and the analyzer, and the polarizer is caused to make rotary oscillations about the beam axis. The output signal of the radiation receiver is supplied to phase-sensitive balancing means which, when the polarization plane rotates, effect a follow-up rotation of the analyzer. In the prior art polarimeter the polarizer is connected to a cylindrical, diametrically magnetized permanent magnet. The permanent magnet is surrounded by concave-cylindrical pole surfaces of an electro-magnet excited by an A.C. voltage. A radial leaf spring fetters the permanent magnet and the polarizer to its position of rest.

Thus, in the prior art driving device, the polarizer oscillates sinusoidally with the main frequency near the resonance of the oscillatory system formed by the polarizer, permanent magnet, and leaf spring. To this end the leaf spring has to be adjusted in its length such that the resonant frequency of the system coincides substantially with the main frequency. This requires an adjustment. In addition, the leaf spring wears out at the clamping location.

In order to keep the oscillation angle constant the driving mechanism has to be stabilized exactly.

The measuring signals have the frequency of the main voltage and the second harmonic of the main frequency. Such signals are easily disturbed by the main voltage. A "boozing noise" occurs. Thereby, the signal processing is complicated.

When the apparatus is switched on, a longer running in time is required because of stability reasons. Therefore, in practical work, the swinging polarizer is also kept switched on when there is no measurement.

Finally, in the prior art driving mechanism the amplitude of the oscillation remains constant. It is also not possible to vary the oscillation amplitude in a defined way without difficulty. When the examined sample has a large angle of rotation, that means when the analyzer transmits much light, the alternating signal obtained with twice the main frequency is small. The sensitivity is low.

SUMMARY OF THE INVENTION

With respect thereto, it is the object of the invention to provide an oscillating polarizer which:
is independent from the main frequency and therefore, can be operated such that the measuring signals are not influenced by disturbances at main frequency;
requires no oscillatory, mechanical system;
permits control by a computer.

According to the invention this object is achieved in that the oscillating polarizer is driven by a stepper motor which is controlled to make a reciprocating movement.

The stepper motor can be controlled by a computer. The movement of the stepper motor and thus of the oscillating polarizer does not depend on the main frequency. Therefore, the oscillating polarizer can operate with a frequency which is sufficiently different from the main frequency. Therefore, the signal processing can easily eliminate disturbances at the main frequency. No oscillatory mechanical system is required.

Modifications of the invention are subject matter of the sub-claims.

An embodiment of the invention will now be described in further detail with reference to the accompanying drawings.

DESCRIPTION

Figure 1:
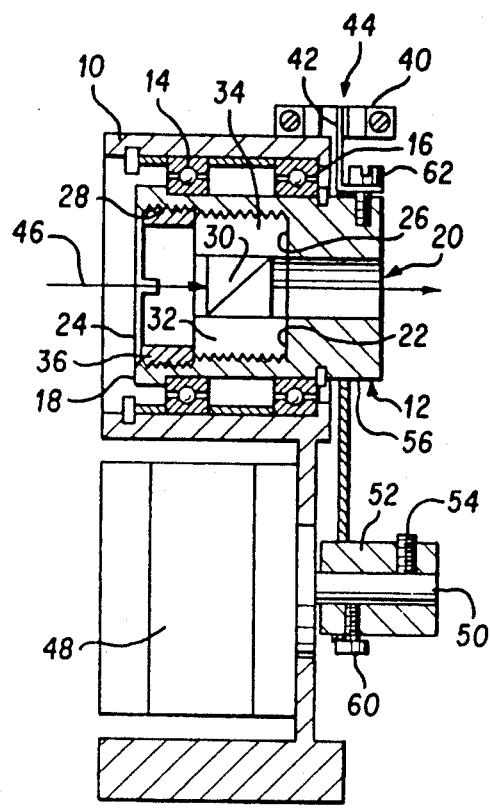
FIG. 1 shows a schematical lateral view of an oscillating polarizer which is driven by a stepper motor.

In a housing 10 a rotor 12 is rotatably mounted in bearings 14 and 16. The rotor 12 comprises a rotor body 18. The rotor body 18 has a generally cylindrical shape and has a central bore 20. The bore 20 consists of a narrower portion 22 and an enlarged portion 24. A shoulder 26 is formed between the narrower portion 22 and the enlarged portion 24. On its side remote from the narrower portion, the enlarged portion 24 has an internally threaded section 28.

A polarizer 30 is arranged in the rotor 12. The polarizer 30 is formed as a polarizer prism. The polarizer 30 is held with an embedding 32 in a holder 34. The holder 34 is arranged in the enlarged portion 24 of the bore 20 and, with its end face, engages the shoulder 26. A clamping bushing 36 is screwed into the internally threaded section 28 of the enlarged portion 24 of the bore 20. In this way the polarizer 30 is held with the holding device 34 between the shoulder 26 and the end face of the clamping bushing 36.

A light barrier 40 is attached to a fixing lug 38 of the housing 10. A vane 42 is arranged on the rotor 12. This vane 42 cooperates with the light barrier 40. Light barrier 40 and vane 42 form a reference position sensor 44 which provides a reference signal when the rotor 12 is in a determined position and the vane 42 enters the light barrier.

A measuring light beam 46 passes along the axis of the rotor 12 through the bore 20.

Furthermore, a stepper motor 48 is arranged in the housing 10. The axis of the stepper motor 48 extends parallel to the axis and the axis of revolution of the rotor 12. Numeral 50 designates a shaft of the stepper motor 48. A driving disc 52 is arranged on the shaft 50. The driving disc 52 is clamped to the shaft 50 by a set screw 54. The driving disc 52 is arranged below a cylinder surface 56 of the rotor 12. A cord 58 is guided around the driving disc 52 and around the cylinder surface 56. The cord 58 is clamped to the driving disc 52 by means of a clamping screw 60. Furthermore, the cord 58 is clamped to the cylinder surface 56 by means of a clamping screw 62. The clamping screw 62 also serves to clamp the vane 42 to the rotor 12. As can be seen from FIG. 2 the cord 58 has two ends 64 and 66. The clamping screw 62 fixes both of the ends 64 and 66 such that the cord is tight. By this fixed cord 58 the rotational movement of the stepper motor 48 is transmitted free from play with a stepping down ratio to the rotor 12 and the polarizer 30.

Figure 2:
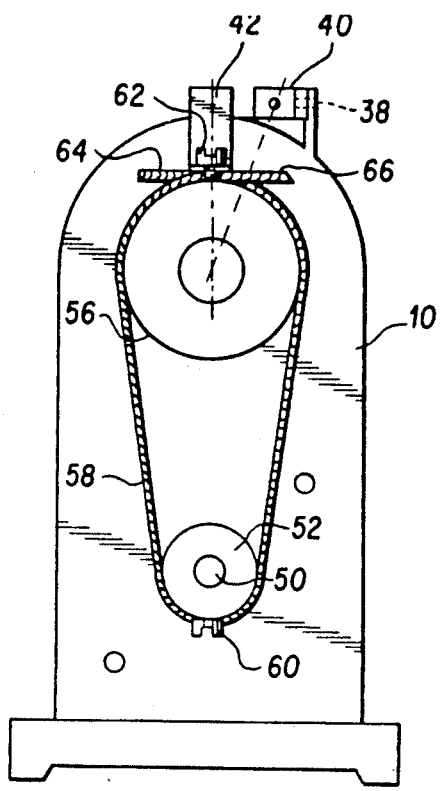
FIG. 2 shows a front view of the oscillating polarizer viewed in the direction opposite to that of the / light beam, i.e., from the right in FIG. 1.
Figure 3:
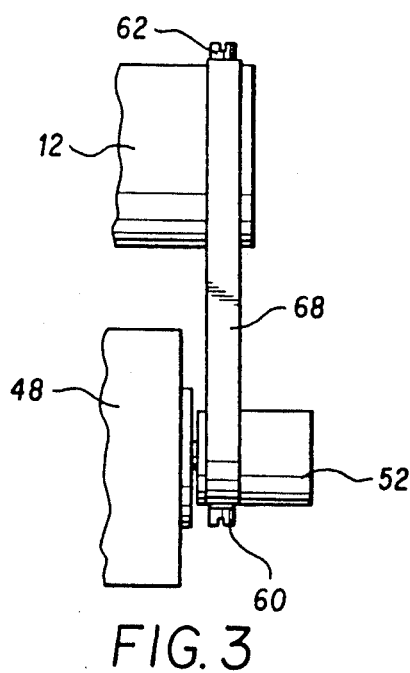
FIG. 3 shows in detail, in a lateral view similar to FIG. 1; the coupling of the oscillating polarizer with the stepper motor through a metal tape.
Figure 4:
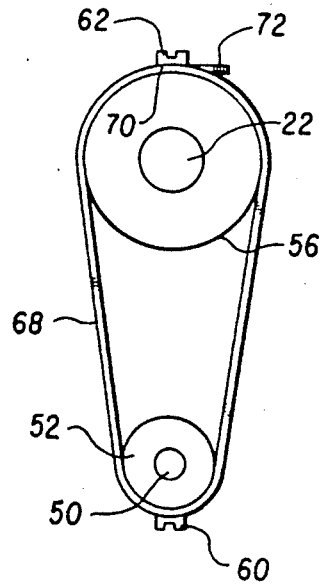
FIG. 4 shows a view taken from the right in FIG. 3.

In the arrangement according to FIGS. 3 and 4, stepper motor 48 and rotor 12 are coupled by means of a metal tape 68, preferably by means of a steel tape. Here also the ends 70 and 72 of the metal tape 68 are both clamped to the rotor 12 by the clamping screw 62. Additionally, the arrangement of FIG. 3 and FIG. 4 is similar to that of FIG. 1 and FIG. 2. Corresponding elements are designated in FIGS. 3 and 4 with the same numerals as in FIGS. 1 and 2.

Figure 5:
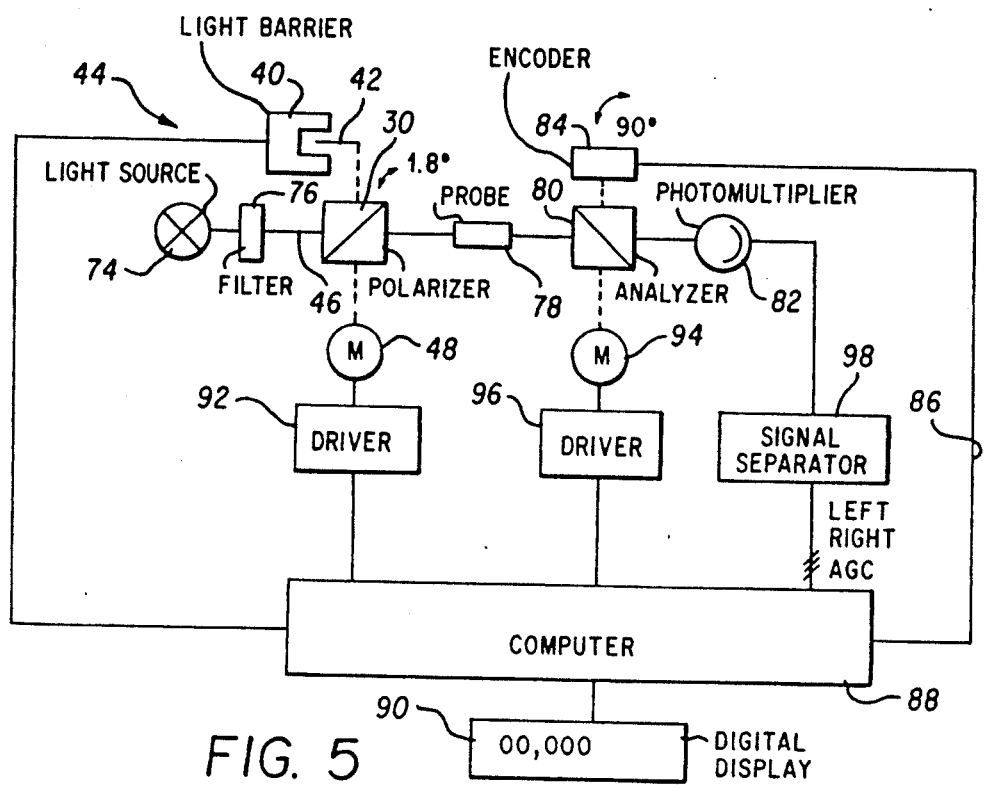
FIG. 5 shows a schematical illustration of a polarimeter with an oscillating polarizer according to FIG. 1 to FIG. 4.
Figure 6A:
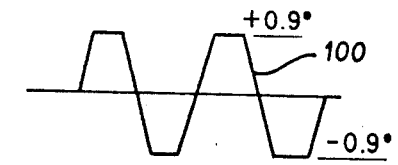
FIG. 6 shows a signal waveforms as they occur in a polarimeter according to FIG. 5.
Figure 6B:
Figure 6C:
Figure 6D:
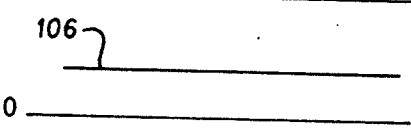
Figure 6E:
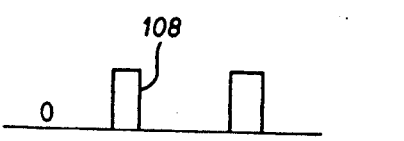
Figure 6F:
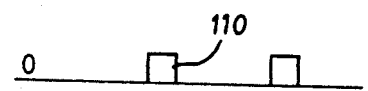

FIG. 5 schematically shows the control of the stepper motor 48 and the arrangement of the polarizer 30 in a polarimeter.

The polarimeter comprises a light source 74. The measuring light beam 46 originates from the light source 74. The measuring light beam passes through a filter 76, the polarizer 30, a vessel 78 and an analyzer 80 and impinges on a photoelectric detector 82 in the form of a photomultiplier. The vessel 78 accommodates a sample whose optical rotation is to be measured. An encoder 84 is coupled to the analyzer 80 which encoder gives rotational angle impulses through a line 86 to a computer 88. The angle of rotation of the analyzer 80 and thus the optical rotation of the sample is displayed on a digital display 90.

The stepper motor 48 is controlled by a computer 88 through a driving circuit 92. The analyzer 80 is rotatable by a stepper motor 94 in a similar way as the stepper motor 48. Also, the stepper motor 94 is controllable by the computer 88 through a driving circuit 96. Numeral 98 designates a circuit which is supplied by the output signal of the detector 82 and effects a signal separation. This circuit 98 provides control signals for the left-hand and right-hand rotation of the analyzer and for the automatic gain control.

The described arrangement operates as follows:

First of all, the polarizer 30 is rotated by the stepper motor 48 to the right in FIG. 2 until the reference position sensor 44 responds, in that the vane 42 just enters the light barrier 40. Then, from this position, the rotor 12 is rotated back by the stepper motor 48 for a fixed number of steps, e.g., ten steps. The position obtained in this way is defined as zero position of the rotor 12. This is the position illustrated in FIG. 2, for example.

From this zero position the rotor 12 is periodically rotated to the left and to the right by an adequate control of the stepper motor 48. In the example illustrated in the first line of FIG. 6 the rotor 12 is rotated by +0.9° and −0.9° from its zero position. Therein, the rotational movement as a function of time has a trapezoidal waveform, as illustrated by graph 100 in FIG. 5. The frequency of the rotational movement can substantially deviate from the main frequency.

Correspondingly, the polarizer 30 and thus the polarization plane of the measuring light beam 46 is rotated. This periodical rotation of the polarization plane is superimposed onto a rotation of the polarization plane by the sample in the vessel 78. The intensity of the light impinging on the detector 82 depends on the angle between the polarization plane of the measuring light beam 46 and the direction perpendicular to the polarization plane of the analyzer 80. This intensity is independent of whether this angle is positive or negative. So, when without a sample, the polarization devices of polarizer 30 in this zero position and analyzer 80 are arranged crosswise, and when the polarizer 30 oscillates, a signal corresponding to graph 102 in the second line of FIG. 6 occurs. If the polarization plane is rotated by the sample, the intensity waveform is shifted relative to the zero line and also becomes asymmetric, as illustrated by the graph 104 in the second line of FIG. 6. From this intensity waveform and the corresponding signal waveform at the detector, three signals are derived by the circuit 98, which signals are illustrated in the third, fourth and fifth lines of FIG. 6. The constant light or constant voltage proportion 106 in the zero position of the polarizer 30 serves as the automatic gain control. Practically speaking, the voltage at the detector 82 designated as a photomultiplier is correspondingly decreased in order to avoid a saturation of the photomultiplier. In addition, the signals 108 and 110 which are obtained relative to the constant voltage proportion when the polarizer 30 rotates to the left, as viewed in FIG. 2 and to the right, respectively, are detected. The difference of these signals serves, through the computer to control the stepper motor 94 such that the analyzer is caused to follow up the rotation of the polarization plane by the sample.

The computer can also control the stepper motor 48 in dependence on the deviation of the analyzer 80 from the balanced position such that the oscillation amplitude of the polarizer 30 is larger with large deviations than with small deviations. Then, with large deviations from the balanced position the decrease of the sensitivity which otherwise can be observed, is counteracted while, on the other hand, by the decrease of the oscillation amplitude with small deviations, the accuracy of the balancing is increased.

Figure 7:
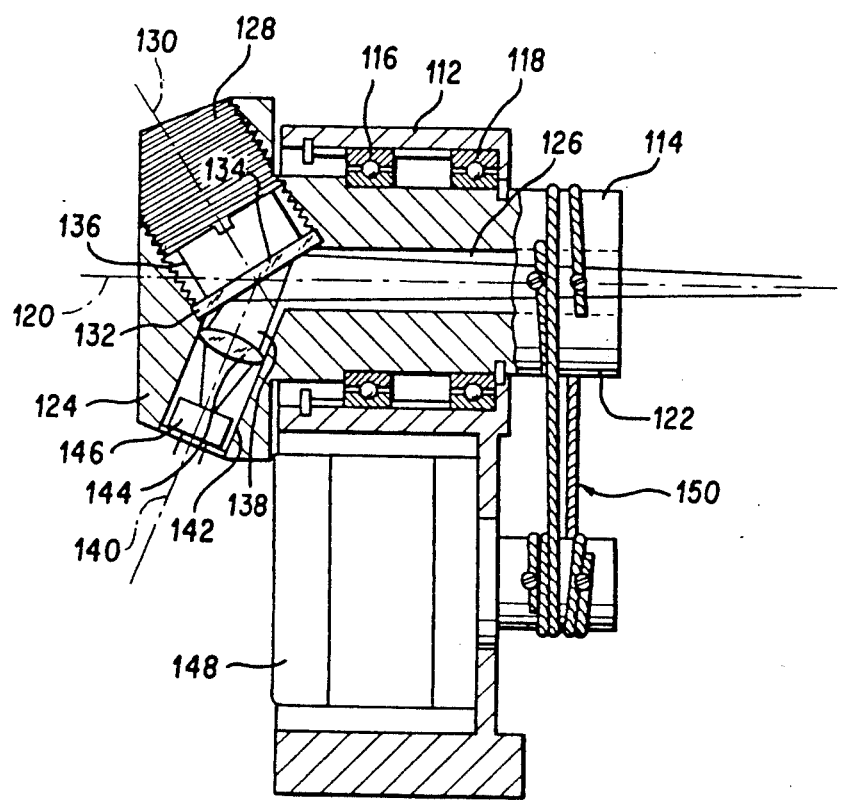
FIG. 7 shows a longitudinal sectional view of an oscillating polarizer used as an analyzer, in which the polarization is caused by reflection at the Brewster angle.

In the embodiment of the oscillating polarizer according to FIG. 7, the reflection of the light at the Brewster angle is used for polarizing the light. Here, the oscillating polarizer is used as the analyzer in a polarimeter, and at the same time, comprises the photoelectric detector of the polarimeter.

In a housing 112 the polarizer rotor 114 is mounted by means of ball bearings 116 and 118 for rotation about an axis 120. The polarizer rotor 114 has a cylindrical shaft 122 and a head portion 124. The shaft 122 is mounted in the ball bearings 116 and 118. The shaft 122 has a longitudinal bore 126. The head portion 124 is provided with a bore 128 of a larger diameter which communicates with the longitudinal bore 126. The axis 130 of the bore 128 forms an angle $\beta$ with the elongated axis of the longitudinal bore. An annular shoulder 132 is formed between the longitudinal bore 126 and the bore 128. A planar reflecting plate 134 is located on the annular shoulder 132. The reflecting plate 134 is secured by a threaded sleeve 136 which is screwed into an internally threaded bore 128. The angle $\beta$ and the defraction angle of the planar reflecting plate 134 are chosen such that the angle β corresponds to the Brewster angle.

Furthermore, a bore 138 is provided in the head portion 124. The axis 140 of the bore 138 also forms an angle β with the elongated axis 120 of the bore 126. Thereby, the axis 140 is located in the plane determined by the axes 120 and 130 and is symmetrical to the axis relative to the axis 120. A bushing 142 is arranged in the bore 138. The busing 142 is arranged in the bore 138. The bushing 142 is closed on the inside by a lens 144. A photoelectric detector is arranged at the outer end of the bushing 142.

The polarization rotor 114 is arranged to be driven by a stepper motor 148 which is provided on the housing 112 and is coupled to the polarizer block 114 through a cord drive 150. The cord drive 150 is similar to that of FIGS. 1 and 4.

Figure 8:
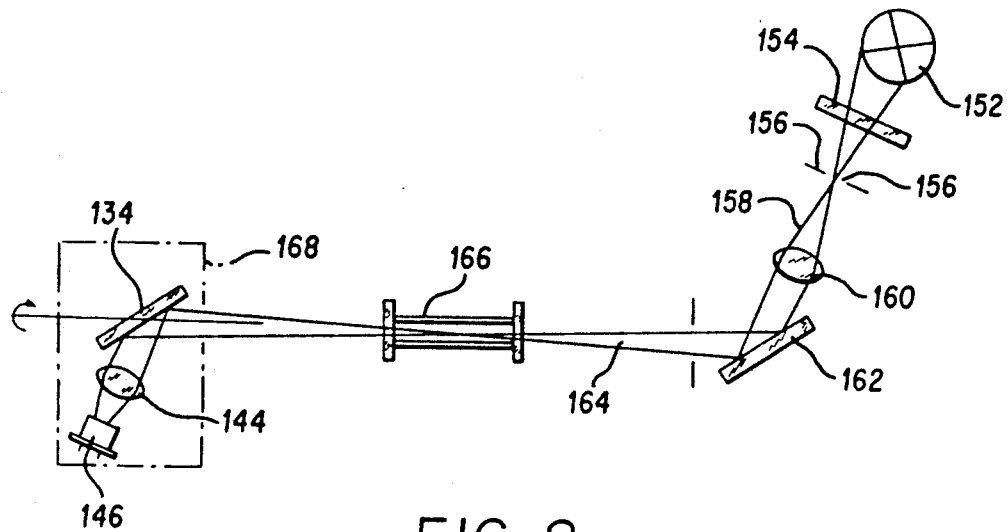
FIG. 8 schematically shows the path of rays of a polarimeter with an oscillating polarizer according to FIG. 7.

The described oscillating polarizer is arranged as analyzer in a polarimeter which is schematically illustrated in FIG. 8.

In FIG. 8 numeral 152 designates a light source. The light of the light source 152 passes through a filter 154 and through a light stop 156. The light beam 158 originating from the light stop 156 is collected by a lens 160 and impinges on a reflecting plate 162 at an angle β. The angle β of 56°, for example, for reflecting plates made of quartz corresponds to the Brewster angle for light of 250 nm wavelength. Thereby, the light is polarized.

Then, the polarized light beam 164 passes through a vessel 166 with an optically active sample. In the sample the light undergoes an optical rotation. The light beam obtained in this way impinges on the described oscillating polarizer 168, acting as analyzer, with the reflecting plate 134, the lens 144 and the detector 146. At the reflecting plate 134, the light beam 164 is again reflected at the Brewster angle β to the detector 146. The polarization rotor is caused by the stepper motor to oscillate. When the polarization plane is rotated by the sample, an asymmetric signal is effected at the detector which signal can be conventionally used for balancing.

For the sake of illustration's clarity, in FIG. 8 the reflecting plates 162 and 134 are illustrated arranged in a parallel manner instead of arranged crosswise.

The polarizer described can also be used with shortwave below 250 nm. On one hand, the Brewster angle depends on the defraction index according to the relation tan β = n. However, it was found that the change of the Brewster angle is so small that, with the wavelength ranges used, an adjustment according to the minimum can be realized with the required accuracy.

I claim:

1. A polarimeter comprising:
a polarizer
a stepper motor for driving said polarizer in an oscillatory manner,
computer means for controlling said stepper motor to make a reciprocating movement wherein the oscillation amplitude as determined by the number of steps of the stepper motor is variable in a controlled manner,
a reference position sensor connected to said polarizer for providing a reference signal when the oscillating polarizer is in a well-defined position,
said reference position sensor comprising a stationary light barrier and a vane connected to the oscillating polarizer which cooperates with said stationary light barrier, and
wherein the stepper motor spaces said reference position sensor a predetermined number of steps from a predetermined reference position to establish a zero position for said reference position sensor relative to the position in which the reference position sensor responds.

2. A polarimeter as set forth in claim 1 wherein:
said computer means automatically decreases the oscillation amplitude when it is approximating a balanced condition.

3. A polarimeter as set forth in claim 2 comprising:
a cord or tape drive for connecting said polarizer to said stepper motor.

4. A polarimeter as set forth in claim 3 comprising:
a shaft adapted to be turned by said stepper motor;
a driving disk on said shaft;
a rotor carrying said polarizer; said tape or cord connecting said rotor to said driving disk.

5. A polarimeter as set forth in claim 4 wherein;
a central portion of said card or tape is guided around said driving disk and is fixed by means of a clamping screw in a central plane determined by the axis of the rotor and the stepper motor, and that the ends of said cord or the tape are guided around said rotor in opposite directions and are clamped under tense conditions by a common clamping screw to the rotor.

6. A polarimeter as set forth in claim 5 wherein said tape is iron.

7. A polarimeter as set forth in claim 6 wherein:
said polarizer rotor comprises a reflecting plate arranged with its plane normal at the Brewster angle (β) relative to the beam axis.

8. A polarimeter as set forth in claim 7 comprising:
a detector arranged on the polarizer rotor in a plane containing the beam axis and the plane normal;
means providing a light beam reflected by the reflecting plate.

* * * * *